(12) United States Patent
Bieri et al.

(10) Patent No.: US 10,739,268 B2
(45) Date of Patent: Aug. 11, 2020

(54) DEVICE FOR MEASURING THE EXPOSURE TO SMALL PARTICLES, IN PARTICULAR NANO TUBES

(71) Applicant: Stat Peel AG, Glarus (CH)

(72) Inventors: Ruedi Bieri, Glarus (CH); Stefano Cattaneo, Landquart (CH)

(73) Assignee: Steel Peel AG, Glarus (CH)

( * ) Notice: Subject to any disclaimer, the term of this patent is extended or adjusted under 35 U.S.C. 154(b) by 0 days.

(21) Appl. No.: 15/560,359

(22) PCT Filed: Mar. 23, 2016

(86) PCT No.: PCT/EP2016/056329
§ 371 (c)(1),
(2) Date: Sep. 21, 2017

(87) PCT Pub. No.: WO2016/150991
PCT Pub. Date: Sep. 29, 2016

(65) Prior Publication Data
US 2018/0073985 A1 Mar. 15, 2018

(30) Foreign Application Priority Data
Mar. 25, 2015 (EP) .................................. 15160800

(51) Int. Cl.
*G01N 21/65* (2006.01)
*G01N 1/22* (2006.01)
(Continued)

(52) U.S. Cl.
CPC ......... *G01N 21/658* (2013.01); *G01N 1/2205* (2013.01); *G01N 1/2273* (2013.01);
(Continued)

(58) Field of Classification Search
CPC .............................. G01N 21/65; G01N 21/658
See application file for complete search history.

(56) References Cited

U.S. PATENT DOCUMENTS 7,460,224 B2 12/2008 Wang et al.
7,524,671 B2 4/2009 Clarke et al.
(Continued)

FOREIGN PATENT DOCUMENTS

EP 2767824 A1 8/2014
JP 2008529006 A 7/2008
(Continued)

OTHER PUBLICATIONS

Jeong-Yeol Yoon, "Lab-on-a-Chip Pathogen Sensors for Food Safety", Aug. 6, 2012,Sensors (Year: 2012).*
(Continued)

*Primary Examiner* — Maurice C Smith
(74) *Attorney, Agent, or Firm* — The Webb Law Firm

(57) ABSTRACT

Provided herein is a collection device for collecting nano particles conveyed in a fluid including: a fluid duct having a fluid inlet and a fluid outlet, a fluid propelling element propelling said fluid through the fluid duct, and a collection element which is arranged in said fluid duct for the collection of nano particles conveyed in said fluid. The collection element includes a collection surface and an enhancement structure arranged in connection with the collection surface. The nano particles are deposited in the region of said collection surface and said enhancement structure and the collection surface with the enhancement structure enhances the spectral properties of said nano particles for a facile analysis of the amount of collected nano particles.

20 Claims, 7 Drawing Sheets

(51) Int. Cl.
  *G01N 15/06* (2006.01)
  *G01N 15/14* (2006.01)
  *G01N 15/00* (2006.01)
  *G01N 1/40* (2006.01)

(52) U.S. Cl.
  CPC ......... *G01N 15/06* (2013.01); *G01N 15/0625* (2013.01); *G01N 15/1434* (2013.01); *G01N 2001/2276* (2013.01); *G01N 2001/2288* (2013.01); *G01N 2001/4088* (2013.01); *G01N 2015/0038* (2013.01)

(56) References Cited

U.S. PATENT DOCUMENTS

| | | | |
|---|---|---|---|
| 7,995,201 B2 | 8/2011 | Bratkovski et al. | |
| 8,186,913 B2* | 5/2012 | Toner | B01D 21/0087 406/92 |
| 9,134,248 B2 | 9/2015 | Meinhart et al. | |
| 9,541,475 B2 | 1/2017 | Chu et al. | |
| 9,638,625 B2 | 5/2017 | Kim et al. | |
| 2006/0023209 A1* | 2/2006 | Lee | G01N 1/2214 356/301 |
| 2007/0236697 A1 | 10/2007 | Zribi et al. | |
| 2010/0091274 A1 | 4/2010 | Bratkovski et al. | |
| 2010/0291588 A1 | 11/2010 | McDevitt et al. | |
| 2010/0296086 A1 | 11/2010 | Wang et al. | |
| 2012/0274935 A1 | 11/2012 | Yamada et al. | |
| 2013/0107254 A1 | 5/2013 | Yu et al. | |
| 2013/0244337 A1* | 9/2013 | Meinhart | G01N 33/0011 436/164 |
| 2014/0234219 A1 | 8/2014 | Jans et al. | |
| 2014/0271366 A1* | 9/2014 | Denomme | G01N 33/54373 422/69 |
| 2016/0223435 A1 | 8/2016 | Takenaka et al. | |
| 2016/0299134 A1 | 10/2016 | Denomme et al. | |

FOREIGN PATENT DOCUMENTS

| | | |
|---|---|---|
| JP | 201085352 A | 4/2010 |
| RU | 2395796 C1 | 7/2010 |
| RU | 2013140105 A | 3/2015 |
| WO | 9401753 A1 | 1/1994 |
| WO | 0000265 A1 | 1/2000 |
| WO | 2012055048 A1 | 5/2012 |
| WO | 2013062554 A1 | 5/2013 |
| WO | 2013122646 A2 | 8/2013 |

OTHER PUBLICATIONS

Julien Cordeiro, "On-chip polychromatic visible light emitters obtained by 3D capillary force assembly", Mar. 14, 2013, Elsevier (Year: 2013).*

Sze et al., "Raman Spectroscopic Characterization of Carbonaceous Aerosols," Atmospheric Envimonment, 2001, pp. 561-568, vol. 35.

* cited by examiner

DEVICE FOR MEASURING THE EXPOSURE TO SMALL PARTICLES, IN PARTICULAR NANO TUBES

CROSS-REFERENCE TO RELATED APPLICATIONS

This application is the United States national phase of International Application No. PCT/EP2016/056329 filed Mar. 23, 2016, and claims priority to European Patent Application No. 15160800.7 filed Mar. 25, 2015, the disclosures of which are hereby incorporated in their entirety by reference.

TECHNICAL FIELD

The present invention relates to a collection device for collecting nano particles in order to determine the long term exposure to nano particles, in particular small oblong nano-particles, such as carbon nano tubes or the like, according to the preamble of claim 1.

Further the present invention relates to a collection element according to claim 11 for use in such a collection device.

Additionally the present invention refers to a system and a method allowing the determination of the amount of collected according to claims 14 or 16, respectively.

PRIOR ART

Today's advances in man-made nanomaterials pose new and unprecedented risks to employees along the whole value chain. Especially airborne, inhalable fiber-shaped nanomaterials like carbon nanotubes (CNTs), carbon nanofibers (CNFs) and graphene nanoplatelets (GNPs) pose asbestos-like health risks when inhaled.

SUMMARY OF THE INVENTION

It is an object of the present invention to provide a collection device that enables logging of the contamination of a person working in an environment in which the above mentioned pollution occurs. In particular with the collection device the long term exposure shall be determined.

Such an object is solved by the collection device according to claim 1. Accordingly a collection device for collecting nano particles conveyed in a fluid is provided in order to determine the exposure of the collection device to nano particles. Said collection device comprises a fluid duct having a fluid inlet and a fluid outlet, a fluid propelling element propelling said fluid through the fluid duct and at least one collection element which is arranged in said fluid duct for the collection of nano particles conveyed in said fluid. The collection element comprises a collection surface and an enhancement structure which enhancement structure is arranged in connection with said collection surface. Said nano particles are deposited in the region of said collection surface and said enhancement structure. The collection surface enhances the spectral properties of said nano particles for enabling a facile analysis of the amount of collected nano particles.

Preferably the collection device is provided exclusively for the collection of the nano particles but not for determining the amount of collected nano particles. This means that the collection device comprises the means to collect the nano particles, but does not comprise means to analyse the nano particles. In more detail, the collection device does not comprise a spectrometer or the like to determine the amount of nano particles. The spectrometer or the like is separate from the collection device.

In other words: The collection device is preferably provided as a carry-on device which can be carried by a user in a polluted or possibly polluted area. Thereby the collection device continuously collects the nano particles, in particular while the person remains in such an area. Even more preferably the collection device is provided as a personal carry-on device.

As it will be clear from the description herein the collection device is preferably part of a system. The system comprises the collection device and a spectrometer which is separate from the collection device. The collection device serves to collect the nano particles and the spectrometer serves to determine the amount of nano particles as collected by the collection device.

It is an advantage that the collection device is provided without the means to analyse the nano-particles, but with the means to collect the same, since the step of analyzing or determining the amount of the collected nano particles can be done with a separate spectrometer as it is outlined below. This means that on the one hand that the results will become more accurate since an enhanced spectrometer can be used compared with devices having a built-in spectrometer and on the other hand that the costs for the collection device can be reduced since no built-in spectrometer has to be provided.

Due to this enhancement structure the analysis of the amount of collected nano particles becomes easier in that the distinction between the nano particles that are of particular interest and other particles becomes easier.

The term nano particles includes but is not limited to at least one or a combination of the following: carbon nano tubes and/or carbon nano fibers and/or carbon nanoplatelets and/or PM 2.5 and other nanotubes and nanofibers. The term fluid refers preferably to air or any other fluid.

The enhancement structure is preferably part of the collection surface. The collection surface can be provided as geometrically defined surface or as a geometrically un-defined surface in which the surface is provided by random structure.

The term in the region of said collection surface and said enhancement structure is preferably to be understood that the particles can be deposited on the surface of the collection element or in the vicinity of the collection element or that the particles can be deposited at least partly within the collection element.

The fluid duct comprises preferably a sidewall extending from said fluid inlet to said fluid outlet providing a closed fluid duct. Therefore the fluid is guided from said inlet to said outlet without any interference to the environment. The cross-section of the fluid duct changes or is constant over its length. The maximum cross-section is preferably in the range of 75 to 175 square millimeters and the minimal cross-section is preferably in the range of 0.2 to 7 square millimeters.

The fluid propelling element is preferably a pump. The volumetric flow rate of the pump is preferably between 1 and 1100 ml/min.

The collection device is preferably provided such that the user can carry it when being exposed to a polluted environment. Hence the collection device is preferably light weight and has a relatively small size. In terms of size it is preferably smaller than 15 centimeters over its maximal dimension.

Preferably said collection surface and said enhancement structure is designed for surface enhanced Raman scattering such that nano particles can be detected by Raman spectroscopy. The enhancement structure is there preferably SERS-active.

In a first embodiment the enhancement structure comprises edges which are arranged in a plane provided by a surface or said collection surface of said collection element. The edges and the plane provided a geometrically defined structure.

Preferably in said first embodiment the collection element is a filter plate having a plurality of filter pores, wherein the margin of said opening provides said edge. Hence the edges are directly provided by the filter pores in said filter plate.

The filter pores can be cylindrical openings extending from a front side of the filter plate to a back side of the filter plate. Thereby the rim of the cylindrical opening in the front side provides said edge.

Preferably said filter pores are evenly distributed over an area of said filter plate which extends over the cross-section of the fluid duct. Preferably said area is congruent with the cross-section of the fluid duct leading to the filter plate.

Preferably the width of said filter pores is in the range of 20 to 900 nanometers, in particular in the range of 80 to 200 nanometers.

Preferably the density of said filters pores is in the range of $10^8$ to $10^{10}$ pores per square centimeter. The pores are preferably arranged in regular spaces to each other.

Preferably the filter plate comprises a coating of a noble metal such as platinum or silver or gold or palladium. Said coating is arranged such that said nano particles are deposited at least partly on the coated regions. The coated regions are preferably,
the whole surface of the filter plate, or
at least the collection surface of the filter plate, or
at least the edges of the filter pores.

The coating has the advantage that spectroscopic differences between the nano particles and the other particles become enhanced.

Preferably the material of the filter plate Silicon nitride (SiN) or Silicon (Si) or Alumina or porous silicon.

In a second embodiment the collection element is filter membrane comprising said enhancement structure. The filter membrane is provided as a geometrically un-defined surface in which the surface is provided by random structure. The filter membrane can be provided by a non-woven or a woven structure.

Preferably said enhancement structure according to the second embodiment is arranged on a surface of the filter membrane. Alternatively the enhancement structure can also be embedded in said filter membrane.

Preferably said filter membrane is at least partly coated with nano particles of a noble metal such as platinum or silver or gold or palladium. The noble metal particle coating has the same effect as mentioned with regard to the first embodiment. The coating is preferably provided in that the noble metal particles are sprayed, dipped or deposited onto the filter membrane. Thereby the coating is provided on the surface of the filter membrane.

Preferably the material of the filter membrane is polycarbonate and/or mixed cellulose ester and/or polytetrafluoroethylene, etc.

Preferably the collection element according to all embodiments further comprises a reference section on which a determined reference or calibration information is placed. This information can be used when determining the amount of nano-particles.

Preferably the collection device comprises in said fluid duct a filter arrangement that is arranged ahead of said collection element as seen in direction of flow of said fluid. With the filter arrangement it can be prevented that particles are deposited on the collection element which are not nano particles.

In a first embodiment the filter arrangement comprises a filter duct with several curved sections, at least one entry into said filter duct and at least one exit from said filter duct. To each of said curved sections one of said exits is arranged. The radius of said curved sections is provided such that particles to be collected are separateable from other particles which are not of interest and wherein at least one of said exit is directed towards collection element.

In a second embodiment the filter arrangement is a filter element having filter pores which are larger than the nano particles to be collected such that the nano particles to be collected pass the filter element.

The filter arrangement in all embodiments is preferably provided such that it filters particles having a size larger than 900 Nanometers.

Hence the filter arrangement according to the second embodiment has filter pores which are in the range of 900 Nanometers. Depending on the environment in which the collection device is used, the filter pores can also be larger than 900 Nanometers in particular to let a particle composition pass which comprises not only the nano particles to be analyzed but also other particles. The size of the filter pores can be up to 5 micro meters depending on the environment in which the collection device is used. In case the particles are to be expected forming agglomerations the filter pores can be up to 20 micro meters.

The filter arrangement, in particular in the second embodiment, can be provided with more than one filter. In particular at least a first filter and a second filter are arranged. The first filter has a larger pore size than the second filter. The second filter is arranged between the first filter and the collection element. Hence the fluid passes the first filter, subsequently the second filter and reaches then the collection element. This means that unwanted particles are filtered out of the fluid stream by means of the first and the second filter.

Preferably the fluid inlet, parts of the fluid duct and the collection element are part of a collection cartridge. The collection cartridge is separate from the collection device but is connectable to or insertable into the collection device. The collection cartridge can be replaced after the collection of nano particles with a new collection cartridge, whereby the used collection cartridge can be disposed. Via a fluid duct interface the parts of the fluid duct of the collection cartridge are connected to the parts of the fluid duct of the collection device.

Preferably said filter duct is part of the fluid duct of the collection cartridge and wherein before of at least one of said exits one of said collection elements is arranged. Preferably each of the exits comprises a collection element. However, it may also be possible to arrange at only one or some of the exits a collection element, whereby at the other of the exits an air regulator element having the same or a similar resistance as the collection element can be arranged in order to maintain similar flow conditions in the duct.

Preferably the collection device comprises a chamber in which the collection cartridge is insertable and wherein within said chamber said fluid duct interface is arranged via which the parts of the fluid duct of the collection cartridge is connected to the parts of the fluid duct of the collection element device.

Preferably the collection device or the collection cartridge comprises a window, that is, in particular for a laser light with a wavelength in the range of 514 to 785 nanometer, in particular 532 nanometer, transparent, under which window said collection element is arranged, wherein through said window the nano particles that are deposited on or in said collection element can be analyzed.

Hence with said window analysis of the amount of collected nano-particles can be done without removing the collection element from said collection device or said collection cartridge. However, in case the collection cartridge is used, the same could be removed from the collection device, but the collection element is not removable from the collection cartridge. This has the advantage that the manipulation of the collection element is not necessary. Therefore an unwanted contamination with foreign particles can be prevented.

Additionally after an analysis the collection device can be re-used as such in case a maximum amount of nano particles has not been reached.

Preferably the collection device comprises further a battery with which at least said fluid propelling element is powered.

Preferably all the components as described herein are arranged on a common support plate. The support plate is preferably part of a housing in which, as mentioned above, comprises also the window.

Furthermore it is also possible to arranged additional elements in said housing such as a chip for further functions, such as storing data, measuring the collection time or the time in use, controlling the pump, etc.

Furthermore the collection device may comprise an accelerometer, and/or a thermometer and/or a hydrometer to monitor further data. Furthermore in terms of communication the collection device may comprise a wireless chip to provide communication functions and/or enables to determine the location of the collection device. The wireless chip can be a WLAN module.

The accelerometer can for example be used to detect the physical activity of the user and to control the pump accordingly. This means, that if the physical activity of the user is high, the volumetric flow rate will also be high if the physical activity of the user is low, the volumetric flow rate will also be low. Therefore the air intake into the collection device is approximately to scale with the air intake into the lung of the carrier of the collection device.

With the thermometer and/or the hydrometer it is also possible to gain further information about the location or the use of the collection device. For example it is possible to detect, if the user is at its workplace or having a break outside.

Preferably the collection device comprises a gas detector. With the gas detector it is possible to determine the properties of the gas surrounding the collection device. For example it becomes possible to determine, if the collection device is in an environment in which nano particles occur, or if it is in another environment.

Based on the position of the collection device that can be determined by using data provided by the sensors as mentioned above, the fluid propelling element can be controlled and/or the collection device can be switched on or off. For example: In case the collection device is in a room in which nano particles are present the collection device will be switched on or the volumetric flow rate of pump will be increased. In case the collection device leaves the room to an environment in which only an uncritical amount of nano particles exists the collection device will switch off or the volumetric flow rate of pump will be decreased.

A collection element, in particular for the use in a collection device as described above, comprises a collection surface and an enhancement structure which enhancement structure is arranged in connection with collection surface. The collection element is separate from the collection device but can be inserted into the collection device.

Preferably the collection element further comprises the features as outlined above in connection with the collection device.

Preferably the collection element is arranged on a carrier element which can be introduced in an intake opening in said collection device. The intake opening may be a part of said housing and/or said support element.

Preferably said filter arrangement and said collection element are provided as one single element which is insertable into the fluid duct. Therefore the filter arrangement and the collection element can be replaced in one single action. It is of course also possible to provide the collection element separate from the filter arrangement.

A collection cartridge for use in a collection device according to the description above,
wherein said collection cartridge comprising the fluid inlet, parts of the fluid duct and the collection element, which collection cartridge is separate from the collection device but is connectable to or insertable into the collection device, and
wherein via a fluid duct interface the parts of the fluid duct of the collection cartridge are connected to the parts of the fluid duct of the collection device.

The collection element as described or the collection cartridge as described can also be provided as a surface swipe device for measuring process contamination.

A system comprises a collection device according to the description above and a spectrometer. The collection device can be placed in said spectrometer which then analysis the collection element in terms of the amount of nano particles present on said surface. Alternatively a transmission electron microscopy device can also be used.

Preferably Raman spectroscopy is used to operate the spectrometer. This is particularly advantageous in combination with the enhanced surface structure.

As described above the collection device is separate from the spectrometer and is insertable into the spectrometer in order to analyze the amount of collected nano particles.

Preferably the collection element or the collection cartridge is exchangeable from the collection device within the spectrometer.

A method for analyzing the exposure to nano particles, in particular carbon nano tubes and/or carbon nano fibers and/or carbon nanoplatelets and/or PM 2.5, comprises the steps of:
  exposing a collection device according to the description above in an environment which is possibly polluted with said nano particles;
  operating said fluid propelling element continuously as long as the Collection device is present in said environment;
  removing the collection device from said environment;
  placing the collection device in a spectrometer according to a system as mentioned above, and
  analyzing the spectrum of the nano particles that are deposited on the enhancement structure of the collection element in order to gain information about the exposure to nano particles.

In case the collection device comprises the window as mentioned above, the analyzing step can be performed without removing the collection element from the collection device. This advantageous as the collection element will not be influenced.

Preferably between the step of placing the collection device in the spectrometer and analyzing the spectrum of nano particles, the method comprises the step of removing the collection cartridge from the collection device.

Preferably the time of duration of the exposure of the device is logged and stored.

Further embodiments of the invention are laid down in the dependent claims.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings.

DESCRIPTION OF PREFERRED EMBODIMENTS

Figure 1:
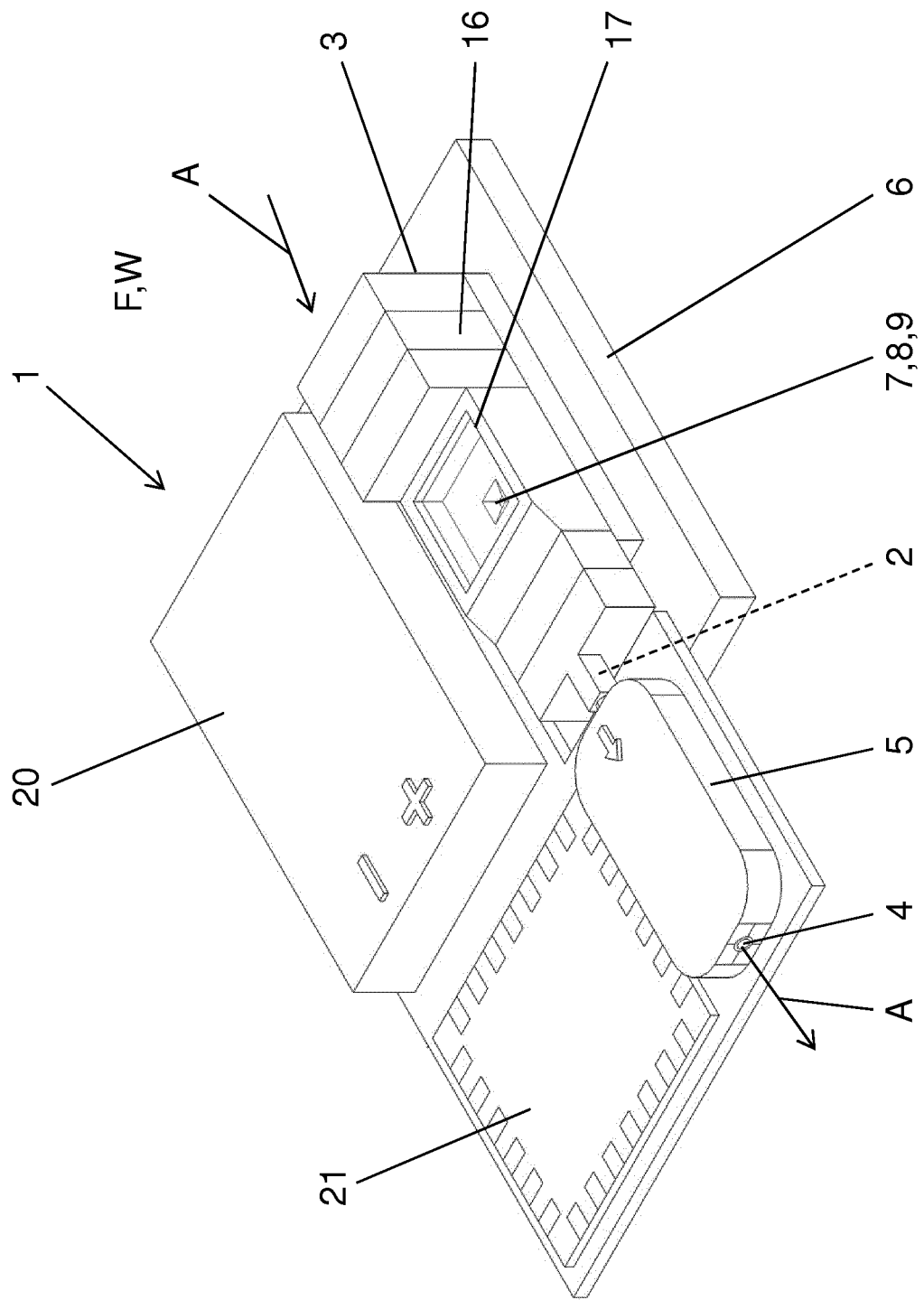
FIG. 1 shows a schematic perspective view of a collection device having a collection according to embodiment of the present invention.

FIG. 1 shows a perspective view of an embodiment of a collection device 1 for collecting nano particles conveyed in a fluid F in order to determine the exposure to nano particles N.

In a preferred use of the collection device 1, it can be carried by user in an environment in which the user is exposed to nano particles N. Thereby the collection device 1 is capable of continuously collect the nano particles N conveyed in the air in said environment. The collection device can for example be used in an industrial production facility or in a research facility in which such nano particles N are conveyed in the air.

Alternatively the collection device 1 may not only be used in such environments but also daily life in order to determine the exposure to PM 2.5 or any other particulate matter with a smaller size.

After use the collection device 1 is brought to an analysis device in order to analyse the amount of collected nano particles over the time of exposure. The analysis device can be a spectrometer as mentioned with regard to FIG. 3 below.

Figure 2:
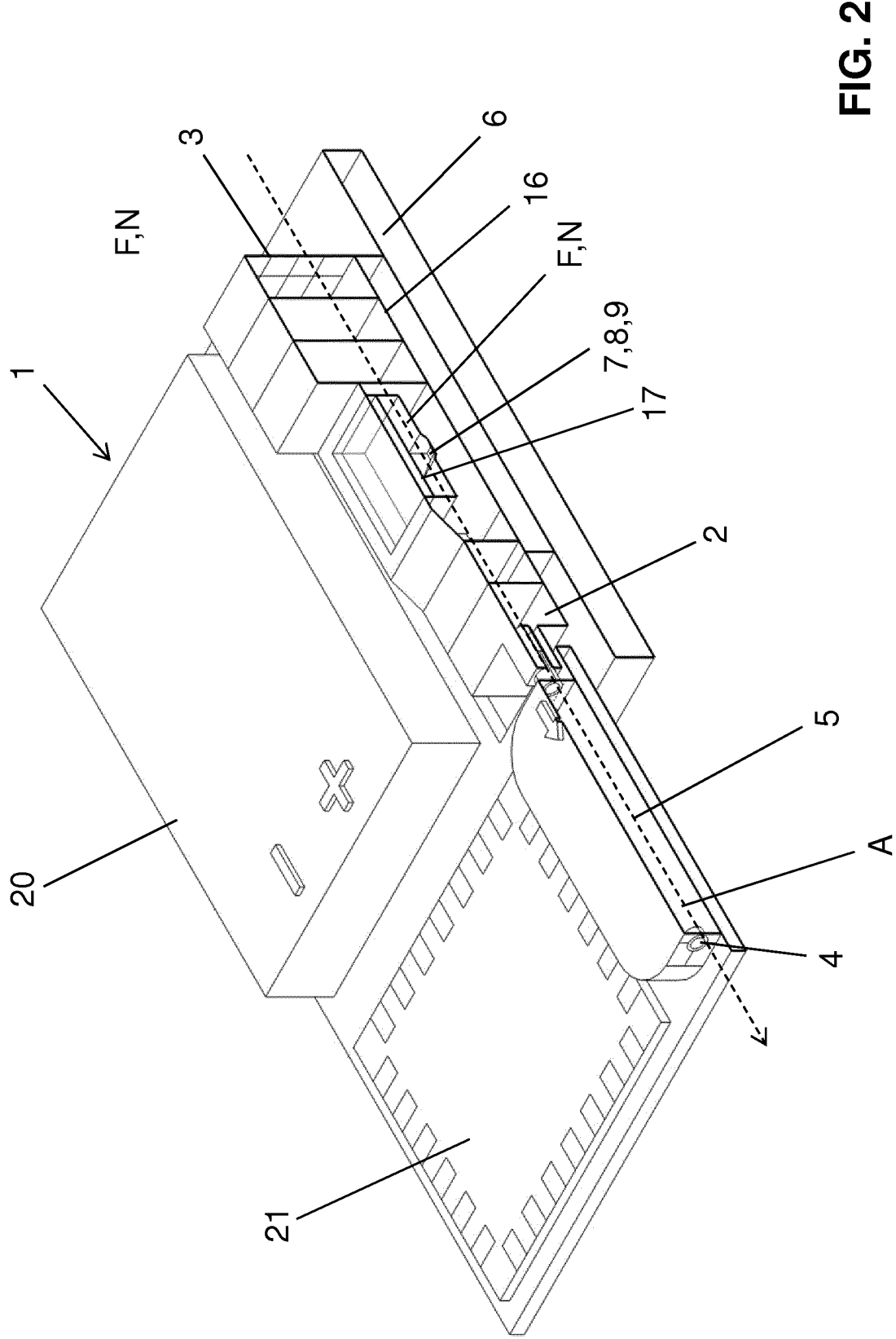
FIG. 2 shows a schematic perspective and partially sectioned view of a collection device having a collection according to embodiment of the present invention.

FIG. 2 shows also a sectional perspective view of the collection device 1. The section line extends through a fluid duct 2 which is part of the collection device 1.

The embodiment of the collection device 1 as shown in FIGS. 1 and 2 comprises a fluid duct 2 having a fluid inlet 3 and a fluid outlet 4. Furthermore the collection device 1 comprises a fluid propelling element 5 propelling said fluid F through the fluid duct 2 and a collection element 7 which is arranged within said fluid duct 2 for the collection of nano particles N conveyed in said fluid F. The fluid propelling element 5 propels the fluid F from the fluid inlet 3 to the fluid outlet 4 and thereby the fluid F is conveyed through or over the collection element 7 on or in which the nano particles N are collected.

The direction of flow of the fluid F in the fluid duct 2 is shown with an arrow having a broken line which is designated with the letter A.

As mentioned the collection device 1 is provided as carry-on device such that a user can carry during the exposure to nano-particles. The collection device 1 therefore is rather small in terms of its physical size. The collection device 1 does not comprise any means to determine the amount of collected nano particles. In other words: the collection device 1 is provided exclusively for the collection of the nano particles N but not for determining the amount of collected nano particles N.

The collection element 7 comprises a collection surface 8 and an enhancement structure 9 which enhancement structure 9 is arranged in connection with said collection surface 8. The nano particles N are deposited in the region of said collection surface 8 and said enhancement structure 9. The collection surface 8 with the enhancement structure 9 enhances the spectral properties of said nano particles N for a facile and easy analysis of the amount of collected nano particles N. Hence, it becomes easier to determine the amount of nano particles N that are deposited on said collection surface 8 with the enhancement structure 9.

The collection element 7 can be arranged differently with regard to the line of flow of the fluid. It is however preferably that the line of flow in vincinity of the collection element 7 is such that a line of flow is oriented perpendicular or angularly tilted to the collection surface 8. The fluid will therefore hit the collection surface 8 with an optimized angle.

The collection element 7 is arranged within the fluid duct 2 between the fluid inlet 3 and the fluid outlet 4. The fluid propelling element 7 is thereby as seen in direction of flow F arranged after the collection element 7. It may also be possible in alternative embodiments to arranged the fluid propelling element 7 as seen in direction of flow F before the collection element 7.

The collection element 7 in the embodiments as shown in the figures is arranged below a window 17. The window 17 is provided so that a visible access to the collection element 7 and the nano particles which are collected by collection element 7 can be provided. This in order to allow an analysis of the amount of collected nano particles without removing the collection element 7 from the collection device 1.

The window 17 is transparent. In particular the window 17 is transparent for a laser light with a wavelength in the range of 514 to 785 nanometres, in particular for a laser light with a wavelength of 532 nanometres.

As seen direction of flow of the fluid F in the fluid duct 2 a filter arrangement 16 before of the collection element 7 is arranged.

Figure 6A:
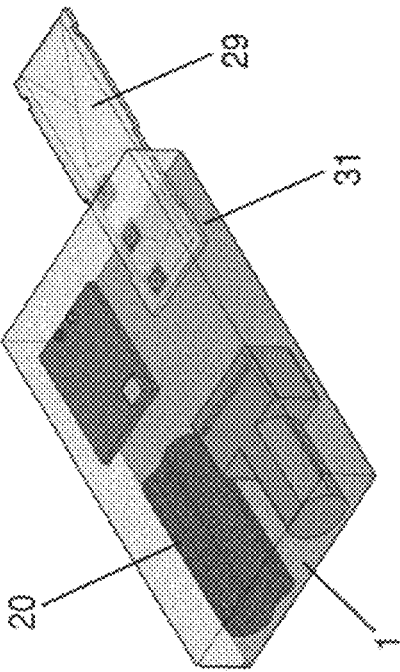
FIG. 6a-6c show further perspective view of the collection device according to FIGS. 1 and 2 with a collection cartridge.
Figure 6B:
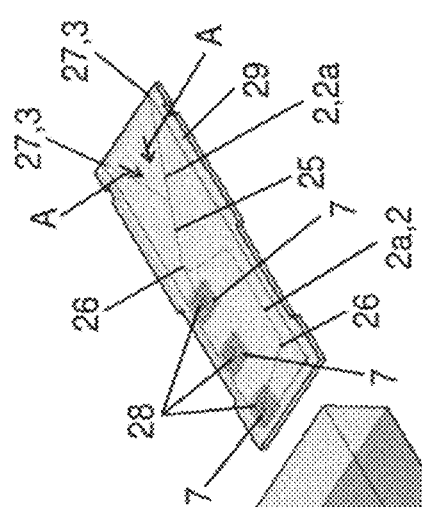
Figure 6B:
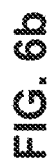
Figure 6C:
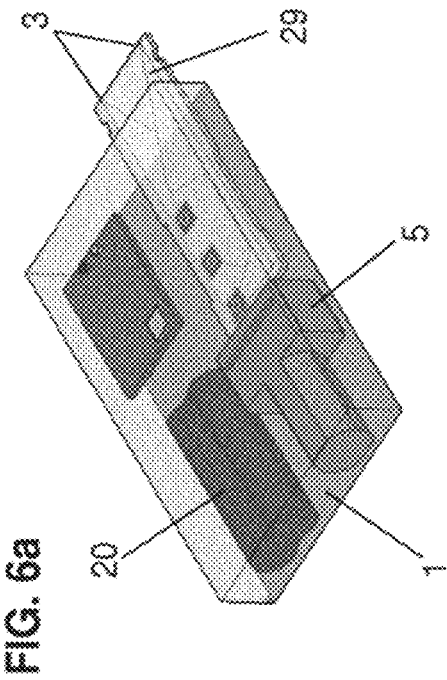
Figure 6C:
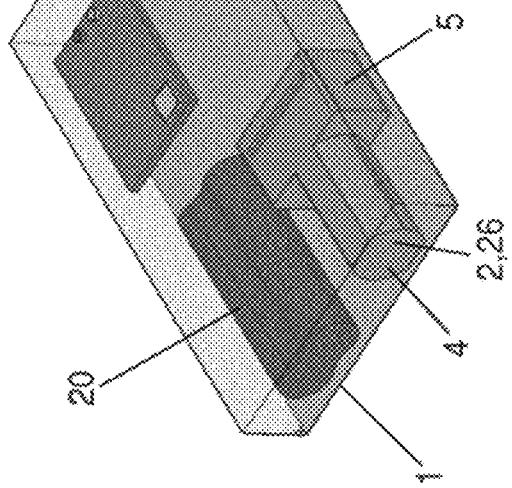

According to a first embodiment as it is shown in FIGS. 6a to 6c the the filter arrangement 16 comprises a filter duct 25 with several curved sections 26, at least one entry 27 into said filter duct 25 and at least one exit 28 from said filter duct 25. The entry 27 can be the fluid inlet 3. Alternatively the fluid inlet 3 may be provided by the collection device 1. To each of said curved sections 26 one of said exits 28 is arranged. The radius of said curved sections 26 is provided such that particles to be collected are separateable from other particles which are not of interest and wherein at least one of said exit 28 is directed towards collection element 7. In other words: It is possible to separate the particles regarding their size. This means at every exit particles with a determined size can be provided. For example it is possible to have at one exit particles smaller than 2 micrometers, at one exit particles with a size of between 2 to 6 micrometers are present and at a third exit particles with a size of larger than 6 micrometers are present. This distribution is to be considered as example and can vary based on the shape of the curved section and based on the velocity of the fluid within the duct.

Preferably at every exit one of said collection elements is arranged. However, it is also possible to arranged only on some of the exits collection elements in order to collect the nano particles having the size which is of interest. In case not all of the exits are provided with the collection element, the exits without the collection element are provided with an air regulator element having the same or a similar resistance as the collection element in order to maintain similar flow conditions in the duct.

Figure 7:
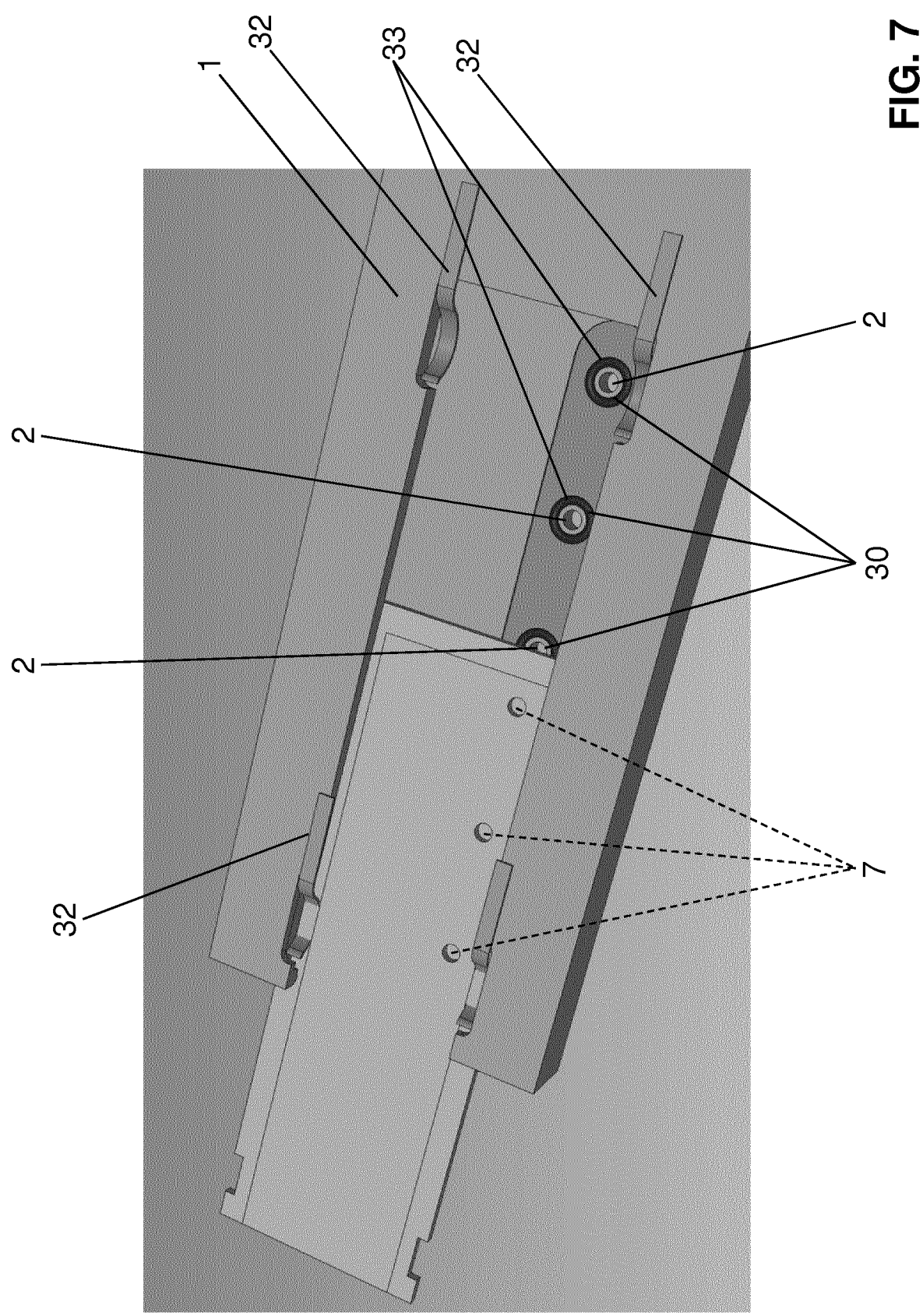
FIG. 7 shows a schematic view of the chamber of the collection device according to the previous figures in which the collection cartridge can be inserted.

As it can be seen in FIG. 7 the exits 28 are directed to an interface 32 of the fluid duct 2 of the collection device 1. Part of the interface is also a sealing element 33 which seals the gap between the exits and the fluid duct 2 in a fluid tight manner. The collection element 7 is arranged close to the exits 28 after the curved section as seen in direction of flow A.

The filter arrangement 16 in a second embodiment as shown in FIGS. 1 and 2 comprises at least one filter, preferably several filters in sequence. With the arrangement of the filter arrangement 16 it is possible that particles which are not of interest, i.e. those which are not nano particles can be pre-filtered by the filter arrangement 16. Therefore the collection element 7 will not be exposed to such particles which may influence the analysis.

As it can be seen in FIGS. 6a to 7 the collection device 1 comprises further a collection cartridge 29 which is insertable into a chamber 31. The collection cartridge 29 is exchangeable. The fluid inlet 2, parts of the fluid duct 2a and the collection element 7 are part of a collection cartridge 29 which collection cartridge 29 is separate from the collection device 1 but is connectable to or insertable into the collection device 1. Via a fluid duct interface 30 the parts 2a of the fluid duct 2 of the collection cartridge 29 are connected to the parts 2b of the fluid duct 2 of the collection device 1.

After the fluid duct interface 30 the fluid duct 2b is guided towards the fluid propelling element 5.

In FIG. 6a the collection cartridge 29 is shown in its inserted stage. This means that the fluid duct 2 is closed at the fluid duct interface 30 and that the collection device 1 is capable of collecting nano particles. In FIGS. 6b and 6c the collection cartridge is shown as being removed from or refitted to the collection element 1. The removal has the advantage that in the analyzing step the collection cartridge 29 can be replaced and analysed, whereby the collection device can used further with a new collection cartridge 29.

The chamber 31 comprises in this embodiment also optional spring means 32 which hold the collection cartridge 29 within the chamber 31.

Furthermore it can be seen from FIGS. 1 and 2 that the collection device 1 in this embodiment further comprises a battery 20 which provides power to at least the fluid propelling element 5.

Furthermore an electronic interface 21 is provided which for examples serves to receive a chip with memory capacity and control capacity. Such a chip can serve as control device for controlling the pump, the battery and possible other elements. Furthermore it may serve to monitor the time of exposure as mentioned above. The electronic interface 21 may also be in connection with a wired or wireless external interface via which data can be exchanged.

The fluid duct 2, as well as the fluid propelling element 5 and the battery 20 and the electronic interface 21 are arranged on a common support element 6. The support element 6 can be a housing in which the elements as just mentioned are arranged. It can also be a simple plate.

Figure 3:
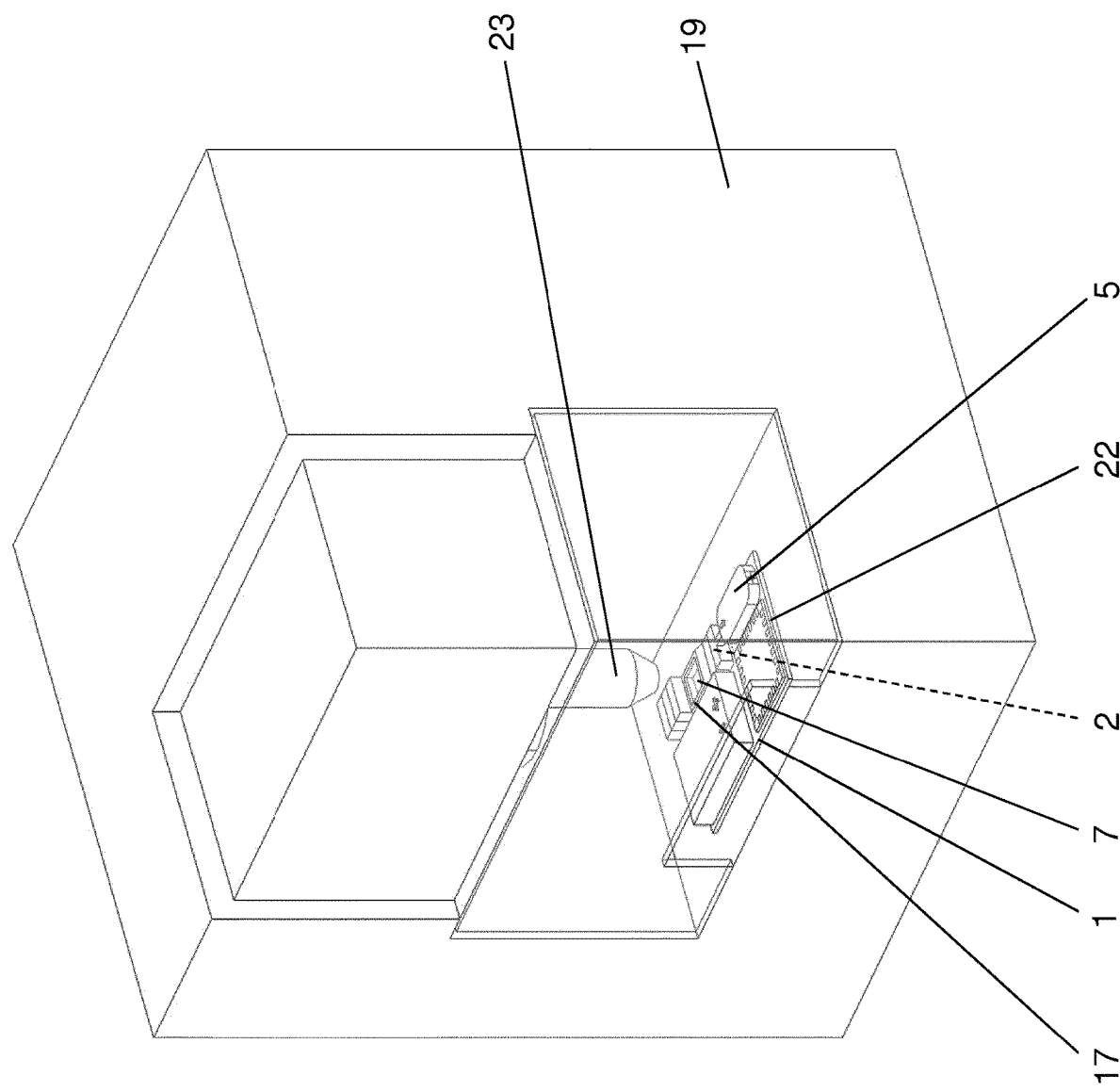
FIG. 3 shows a system with the collection device according to the present invention.

FIG. 3 shows a system comprising a collection device 1 according to FIGS. 1 and 2 and a spectrometer 19. Thereby the collection device 1 or the collection cartridge is placed within a reception 22 within said spectrometer 19. The spectrometer comprises a laser unit 23. Thereby the collection device 1 is placed such that the window 17 of the collection device or the collection cartridge becomes positioned under the laser unit 23. With the laser unit 23 the collection element 7 in particular the collection surface 8 with the nano particles N can be scanned such the amount of collected nano particles can be analysed.

Furthermore it is also possible to read further information from the collection element 7, an ID of the collection element 7 or further data which are of interest. This data can be exchanged by means of a not shown electronic wired or wireless interface or by the laser unit 23. The time of exposure is preferably tracked with the electronic interface 21.

The spectrometer is preferably a spectrometer which can be operated by Raman spectroscopy. Raman spectroscopy is particularly advantageous when it comes to the analysis of the nano particles on said collection surface 8. The spectrometer laser unit 23 scans the collection surface 8. Afterwards collected spectral information of fibers and other particles are analyzed and compared to library data. Together with the data provided by the collection element 1 and the time of exposure an exposure level for the individual are calculated. Preferably the results are presented in definable exposure ranges like "not detected", <<OEL (occupational exposure level), <OEL ~OEL, <<OEL). The exposure level can be indicated by color coding, text coding or the like. Furthermore the exposure level may also stored in a data base for further use. The exposure level can also be a recommended exposure level instead of the occupational exposure level.

Besides the standard OEL detection additional material specific information can be retrieved from the filtered fibers and particle and used for further processing. Preferably the spectrometer determines the exposure level and provides the data for the user or any other personnel. The exposure level can be outputted to a computer, a smart phone and/or server. In particular it is advantageous to archive the determined exposure levels.

In a method for analyzing the exposure to nano particles, in particular carbon nano tubes and/or carbon nano fibers and/or carbon nanoplatelets and/or PM 2.5, with the collection device 1 and the spectrometer 19 comprising the steps of:

exposing the collection device 1 in an environment which is possibly polluted with said nano particles;

operating said fluid propelling element 5 continuously as long as the collection device 1 is present in said environment;

removing the collection device 1 from said environment;

placing the collection device 1 in a spectrometer according to a system as mentioned above, and analyzing the spectrum of the nano particles that are deposited on the enhancement structure 9 of the collection element 7 in order to gain information about the exposure to nano particles.

In case the collection element 7 is part of the above mentioned cartridge the method comprises the step of removing the collection cartridge 29 from the collection device 1 between the step of placing the collection device in the spectrometer and analyzing the spectrum of nano particles.

The pump is preferably operated as long as the person using the collection device 1 is exposed to the particles to be determined. In case the user works in a factory the pump is operated over the whole shift length, for example over 8 to 12 hours. With such an operation long term measurement becomes possible.

Figures 4A, 4B:
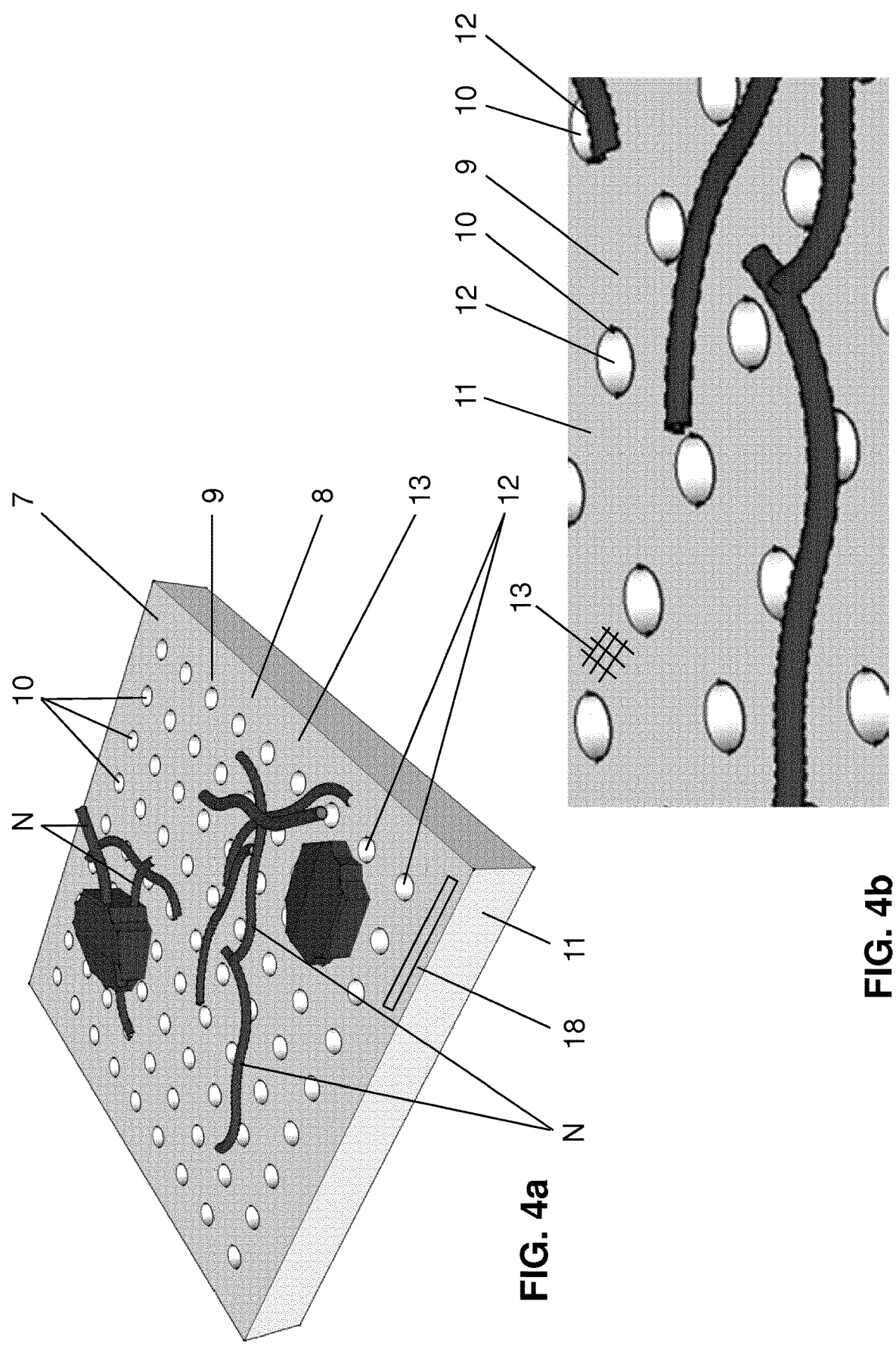
FIG. 4a/b show a detailed view of a first embodiment of a collection element to be used in a collection device according to FIG. 1.

FIG. 4a and FIG. 4b show detailed view of the collection element 7 according to a first embodiment. The collection element 7 according to FIGS. 4a and 4b can be place in the fluid duct 2 in a collection element 1 as mentioned above.

The collection element 7 according to the first embodiment is provided as a filter plate 11 having a plurality of filter pores 12. The filter pores 12 comprise are the margins of the pores 12 an edge 10. The edge 10 here is a defined geometric structure. Several filter pores 12 are arranged in the filter plate 11 thereby providing several edges 10 which are arranged in a common plane P. The plane p is provided by the surface of the collection element 7. The edges 10 provide said enhancement structure 9. Due to these edges 10 it is possible that the spectroscopic contrast of nano particles N that are deposited on said filter plate 11 is enhanced.

Said filter pores 12 are preferably evenly distributed over an area of said filter plate 11. When the filter plate 11 is inserted in said fluid duct 2 it extends over the cross section of the fluid duct 2. The filter pores 12 are therefore evenly distributed over the cross section of the fluid duct 2. Therefore the fluid F can flow through the filter plate 10 very easily.

The width W of the filter pores 12 is preferably in the range of 20 to 900 nanometres, in particular in the range of 80 to 200 nanometres. This means that nano particles being in the same range will be deposited on the collection surface 8 as it is shown in FIG. 4a and FIG. 4b.

The density of the filter pores 12 is in the range of $10^8$ or $10^{10}$ per square centimetre. It is clear that FIG. 4a and FIG. 4b are not to scale.

Preferably the filter plate 11 comprises a coating 13 of a noble material, such as platinum or silver or gold or palladium. The coating 13 is arranged such that said nano particles N are deposited at least partly on the coated regions. It is preferably that the coated regions cover the collection surface 8 of the collection device 1 on which the nano particles N are deposited. The coating is shown in FIG. 4b by a hedged area 13 as an example. However it is clear that the coating 13 extends preferably over the whole collection surface 8. Depending on the method applied to add the coating 13, the latter may extend also at least partly in the filter pores 12. In another variant it may also be possible that the filter plate 11 is fully coated.

The material of the filter plate is preferably Silicon nitride (SiN) or Silicon (Si) or Alumina or porous silicon.

Figures 5A, 5B:
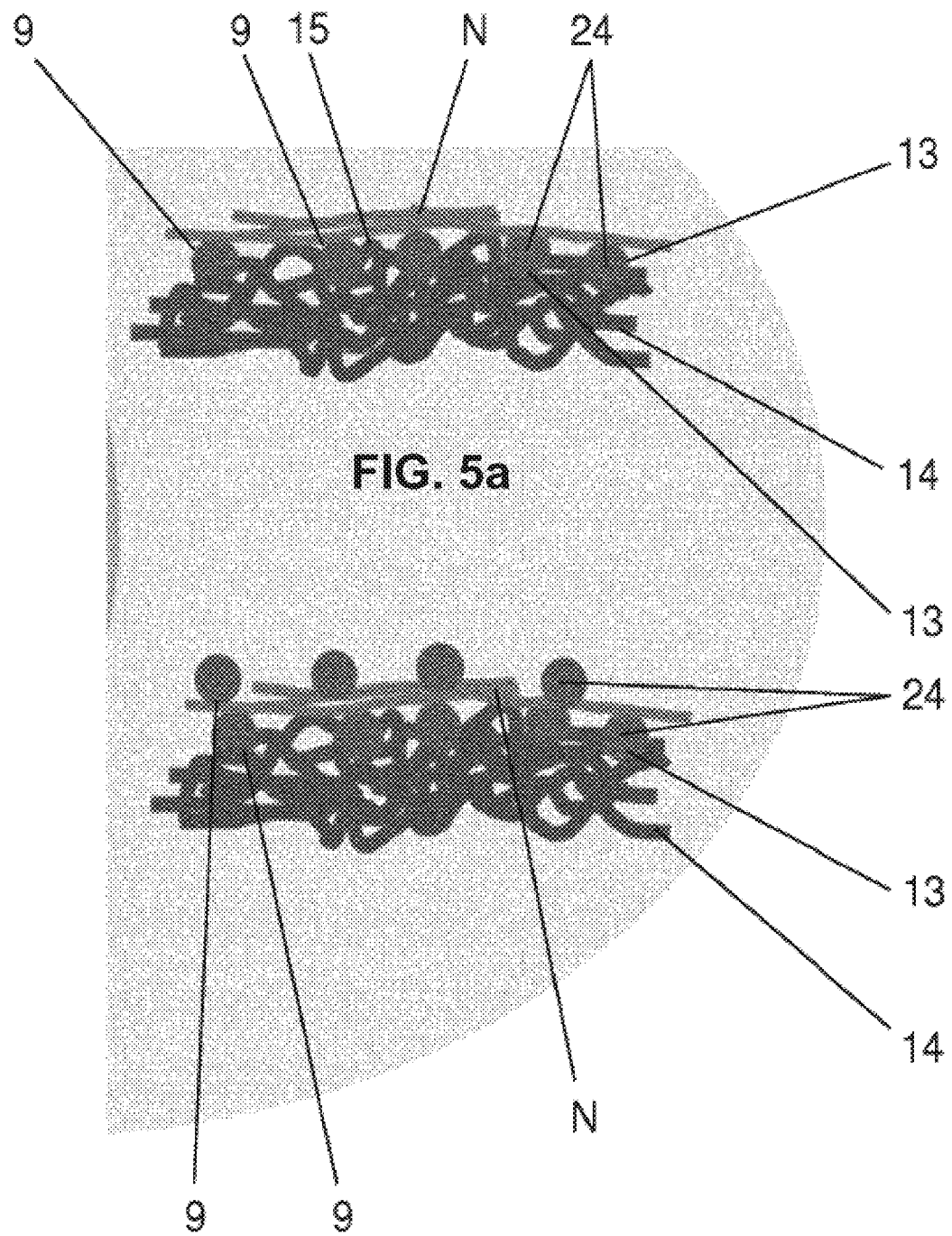
FIG. 5a/b show a detailed view of a second embodiment of a collection element to be used in a collection device according to FIG. 1.

In FIG. 5 two variants of a second embodiment of the collection element 7 are shown. Here the collection element 7 is a filter membrane 14 which comprises said enhancement structure 9. The enhancement structure 9 is arranged on a surface of the filter membrane 14 and/or it may be embedded in said filter membrane 14. The enhancement structure 9 is here provided as particles, in particular nano particles 24 which are arranged on the surface 5 or embedded in the filter membrane 14. The particles 24 can be spherical or capsula shaped. The particles can be applied to the filter by spraying or depositing/filtering process. Further it can also be possible to have the particles providing the enhancement structure 9 dissolved in a liquid which can be deposited on the filter membrane 14.

The filter membrane 14 is also at least partly coated with the coating 13. In particular the coating 13 can be applied to said fillets or it may provide said fillets 24. The coating material 13 is the same as mentioned with regard to the first embodiment of the collection element 7.

The material of the filter membrane 14 is preferably polycarbonate and/or mixed cellulose ester and/or polytetrafluoroethylene, etc.

Furthermore both embodiments of the collection element 7 may comprise a reference section 18. The reference section 18 is shown in FIG. 4a. The reference section 18 serves to store information on the collection element concerning the identity of the collection element 7 so as to allow a recognition of the collection element 7 when it is used in the spectrometer 19 as shown in FIG. 3.

Furthermore the collection element 7 can be provided on an insert-like element that can be inserted into a slot into the fluid duct. One possible example is the collection cartridge 29 as mentioned above. Preferably the fluid duct comprises a respective slot to receive said collection element. Furthermore the filter arrangement 16 can also be provided by means of an insert-like element.

Additionally the filter arrangement 16 can also be combined with the collection element 7 in one single device. Therefore this one single device can be replaced in case the filter arrangement 16 and/or the collection element 7 needs to be replaced.

LIST OF REFERENCE SIGNS

1 collection device
2 fluid duct
3 fluid inlet
4 fluid outlet F Fluid
5 fluid propelling element
6 support element
7 collection element
8 collection surface
9 enhancement structure
10 edges
11 filter plate
12 filter pores
13 coating
14 filter membrane
15 surface
16 filter arrangement
17 window
18 reference section
19 spectrometer
20 battery
21 electronic interface
22 reception
23 laser unit 24 nano particles
25 filter duct
26 curved sections
27 entry
28 exit
29 collection cartridge
30 fluid duct interface
31 chamber
32 spring means
33 sealing element

The invention claimed is:

1. A system comprising:
at least one collection device for collecting nano particles conveyed in a fluid in order to determine an exposure of the collection device to nano particles;
a collection cartridge; and
a spectrometer,
wherein said collection device comprises:
a fluid duct having a fluid outlet;
a fluid propelling element propelling said fluid through the fluid duct; and
at least one collection element which is arranged in said fluid duct for the collection of nano particles conveyed in said fluid,
wherein the collection element comprises a collection surface and an enhancement structure which enhancement structure is arranged in connection with said collection surface,
wherein said nano particles are deposited in the region of said collection surface and said enhancement structure,
wherein said collection surface with the enhancement structure enhances the spectral properties of said nano particles for enabling a facile analysis of the amount of collected nano particles,
wherein said collection cartridge is separate from the collection device but is connectable to or insertable into the collection device,
wherein the collection cartridge is exchangeable from the collection device within the spectrometer,
wherein a fluid inlet of the fluid duct, parts of the fluid duct, and the collection element are part of said collection cartridge,
wherein via a fluid duct interface parts of the fluid duct of the collection cartridge are connected to parts of the fluid duct of the collection device,
wherein the spectrometer is a Raman spectrometer, and
wherein the collection device is separate from the spectrometer and is insertable into the spectrometer in order to analyze the amount of collected nanoparticles.

2. The system according to claim 1, wherein the collection device is provided exclusively for the collection of the nano particles but not for determining the amount of collected nano particles and/or wherein the collection device is provided as a carry-on device.

3. The system according to claim 1, wherein said collection surface and said enhancement structure is designed for surface enhanced Raman scattering such that nano particles can be detected by the Raman spectrometer.

4. The system according to claim 1, wherein said enhancement structure comprises edges which are arranged in a plane provided by a surface or said collection surface of said collection element.

5. The system according to claim 4, wherein the collection element is a filter plate having a plurality of filter pores, wherein a margin of said filter pores provides said edge.

6. The system according to claim 5,
wherein said filter pores are evenly distributed over an area of said filter plate which extends over a cross-section of the fluid duct;
and/or
wherein a width of said filter pores is in the range of 20 to 900 nanometers;
and/or
wherein a density of said filters pores is in the range of $10^8$ to $10^{10}$ pores per square centimeter.

7. The system according to claim 4,
wherein the collection element is a filter plate having a plurality of filter pores, wherein a margin of said filter pores provides said edge,
wherein said filter pores are evenly distributed over an area of said filter plate which extends over a cross-section of the fluid duct;
and/or
wherein a width of said filter pores is in the range of 20 to 900 nanometers, and/or
wherein a density of said filters pores is in the range of $10^8$ to $10^{10}$ pores per square centimeter.

8. The system according to claim 4, wherein the filter plate comprises a coating of a noble metal, which coating is arranged such that said nano particles are deposited at least partly on coated regions which coated regions are,
the whole surface of the filter plate, or
at least the collection surface of the filter plate, or
at least the edges of the filter pores.

9. The system according to claim 4, wherein the collection element is a filter plate having a plurality of filter pores, wherein a margin of said filter pores provides said edge, and wherein the filter plate comprises SiN or Si or Alumina or porous silicon.

10. The system according to claim 1, wherein said collection element is a filter membrane comprising said enhancement structure.

11. The system according to claim 10,
wherein said enhancement structure is arranged on a surface of the filter membrane and/or is embedded in said filter membrane; and/or
wherein said filter membrane is at least partly coated with a coating of a noble metal; and/or
wherein the material of the filter membrane is polycarbonate and/or mixed cellulose ester and/or polytetrafluoroethylene.

12. The system according to claim 1,
wherein the collection element further comprises a reference section on which a determined reference or calibration information is placed; and/or
wherein the collection device further comprises a battery with which at least said fluid propelling element is powered.

13. The system according to claim 1, wherein the collection device comprises in said fluid duct a filter arrangement that is arranged ahead of said collection element as seen in direction of flow of said fluid.

14. The system according to claim 13, wherein the filter arrangement comprises a filter duct with several curved sections, at least one entry into said filter duct and at least one exit from said filter duct, wherein to each of said curved sections one of said exits is arranged, wherein a radius of said curved sections is provided such that particles to be collected are seperable from other particles which are not of interest and wherein at least one exit is directed towards the collection element.

15. The system according to claim 14, wherein the filter duct is part of the fluid duct of the collection cartridge and wherein said collection element is arranged before said at least one exit.

16. The system according to claim 13, wherein the filter arrangement is a filter element having filter pores which are larger than the nano particles to be collected such that the nano particles to be collected pass the filter element.

17. The system according to claim 1, wherein the collection device comprises a transparent window for a laser light with a wavelength in the range of 514 to 785 nanometers, under which window said collection element is arranged, wherein through said window the nano particles that are deposited on or in said collection element can be analyzed.

18. The system according to claim 1, wherein the collection device comprises in said fluid duct a filter arrangement that is arranged ahead of said collection element as seen in direction of flow of said fluid, and wherein said filter arrangement and said collection element are provided as one single element which is insertable into the fluid duct.

19. A method for analyzing the exposure to nano particles with the system of claim 1, comprising the steps of:
- exposing said collection device in an environment which is possibly polluted with nano particles;
- operating said fluid propelling element continuously as long as the collection device is present in said environment;
- removing the collection device from said environment;
- placing the collection device in said spectrometer, and
- analyzing a spectrum of the nano particles that are deposited on the enhancement structure of the collection element in order to gain information about the exposure to nano particles.

20. The method according to claim 19, wherein a time duration of the exposure of the device and/or device data and/or employee data is logged and/or stored and/or transmitted and/or processed.

\* \* \* \* \*